United States Patent [19]
Tessier et al.

[11] Patent Number: 5,711,639
[45] Date of Patent: Jan. 27, 1998

[54] CLAMP FOR CYLINDRICAL OBJECT

[75] Inventors: Noel Tessier, North Attleboro; Anthony Colageo, Sharon; Depankar Neogi, Woburn; Craig Douglas, Lexington, all of Mass.

[73] Assignee: Emerson & Cuming Composite Materials, Inc., Canton, Mass.

[21] Appl. No.: 565,449

[22] Filed: Feb. 1, 1996

[51] Int. Cl.⁶ .............................. F16L 1/12; A44B 11/25
[52] U.S. Cl. .............................. 405/171; 24/285; 24/483; 24/495; 441/133
[58] Field of Search .............................. 24/274, 285, 19, 24/20 LS, 483, 495, 908; 285/420, 410, 45, 373; 405/171; 441/133, 134

[56] References Cited

U.S. PATENT DOCUMENTS

| | | | |
|---|---|---|---|
| 2,028,609 | 1/1936 | Irwin | 24/20 LS |
| 3,705,432 | 12/1972 | Watkins, Jr. | 441/133 |
| 3,729,756 | 5/1973 | Cook et al. | 441/133 |
| 4,128,921 | 12/1978 | Heinze et al. | 24/19 X |
| 4,131,788 | 12/1978 | Fulbrook | 24/19 X |
| 4,381,020 | 4/1983 | Daghe et al. | 24/279 X |
| 4,386,919 | 6/1983 | Kadono | 441/133 |
| 4,596,531 | 6/1986 | Schawann et al. | 441/133 |
| 4,646,840 | 3/1987 | Bartholomew et al. | 405/171 X |
| 4,757,809 | 7/1988 | Koeneman et al. | |

FOREIGN PATENT DOCUMENTS

| | | | |
|---|---|---|---|
| 2444856 | 8/1980 | France | 405/171 |
| 196665 | 4/1923 | United Kingdom | 24/279 |
| 1554114 | 10/1979 | United Kingdom | 441/133 |

*Primary Examiner*—James R. Brittain
*Assistant Examiner*—Hanh V. Tran
*Attorney, Agent, or Firm*—Paul J. Cook

[57] ABSTRACT

A clamp for a cylindrical object is provided which is formed of fibers in the form of woven fabric molded in a polymeric matrix. The clamps have two free ends through which one or two rods extend. The compressive force exerted by the clamp can be adjusted by adjusting the distance between the free end.

15 Claims, 9 Drawing Sheets

CLAMP FOR CYLINDRICAL OBJECT

BACKGROUND OF THE INVENTION

This invention relates to a clamp for attaching a device to a cylindrical object. More particularly, this invention relates to a clamp for a cylindrical object which also can function to transfer a loading force.

At the present time clamps for a cylindrical device are utilized in a wide variety of environments. For example, clamps are utilized on riser conduits for transporting crude petroleum from oil reserves beneath the sea. The clamps form a support for a buoyancy element which is attached to the conduit through the clamps in order to increase the overall buoyancy of the conduit and maintain it in a substantially vertical submerged position. The buoyancy element cannot be attached directly to the conduit since slippage occurs between the conduit surface and the surface of the buoyancy element caused by the tendency of the element to float to the sea surface. The clamp presently utilized can be adjusted to exert a compression force about the conduit to retain the clamp in a stationary position on the conduit but without causing damage to the conduit as a result of excessive compressive force. The buoyancy element than can be permanently attached to the clamp in a manner to prevent slippage of the buoyancy element along the conduit's length. These clamps are designed for use in a submerged environment for extended times, up to about 25 years.

At the present time, clamps for a submerged riser conduit carrying petroleum are formed of metal compositions. These clamps are relatively heavy and expensive. The increased weight imposed by the metal clamp in the conduit must be overcome, usually by using increased volumes of the buoyancy element which also increases expense. The clamps are locked with a metal fastener or with a strap such as in formed from Kevlar fibers available from Dupont Corporation.

Accordingly, it would be desirable to provide a clamp formed from a less dense composition then a metal composition. In addition, it would be desirable to provide such a clamp which is capable of securing a load bearing element. Furthermore, it would be desirable to provide such a clamp which can be utilized submerged in sea water for extended time periods.

SUMMARY OF THE INVENTION

The present invention provides a clamp for a cylindrical object formed of a woven fiber layers molded within a shaped polymeric matrix. The clamp can be formed from two sections joined together, each with a hinge means at one end and a free end opposite the end joined by the hinge. The free ends of each section are joined together in a manner which permits exerting a range of compressive forces on the cylindrical object positioned within the clamp. The clamp has an interior surface with the same shape as the outside surface of the cylindrical object. Fibers in the woven fiber layers extend in the direction about the perimeter of the cylindrical object to provide hoop strength in the clamp. Holes are provided in the shaped polymeric matrix to accommodate a rod portion of a hinge structure and a rod or rods extending through the free ends. When two rods are utilized, the free ends, they are joined together by means for adjusting the distance between the two rods thereby providing means for adjusting the compressive force by the clamp on the cylindrical object. Alternatively, the clamps of this invention can be formed of a single section, free of a hinged portion but having two free ends joined together as set forth above.

DESCRIPTION OF SPECIFIC EMBODIMENTS

The clamp of this invention is formed by molding layers of woven fibers in a polymeric material wherein the interior surface of the clamp has the same shape as the exterior surface of the cylindrical object about which the clamp is positioned. Fibers of the woven fiber extend in a direction of the perimeter of the cylindrical object to provide strength to the clamp. The clamps can be formed of a single molded piece or two molded sections joined together. For ease in molding, it is preferred that the clamp be formed of two molded sections. When formed of two molded sections, one end of each section is joined together in a hinge structure while the opposing free ends of each section are joined together by means capable of adjusting the distance between the free ends so that a varying compressive force can be applied by the clamp to the cylindrical object. When the clamp is formed of a single molded piece, the hinge section is eliminated but the free ends are retained. The free ends are joined as described above for the two section clamp.

When a hinge is utilized in the clamp, holes are formed in the hinge end of the two sections to accommodate a hinge rod. The hinge rod is adhered to the interior surfaces in the holes of one of the section while the interior surface of the hinge holes in the second sections are free to rotate about the hinge. When the hinge ends are eliminated in the single piece clamp, the single piece has sufficient flexibility to permit its bending without mechanical damage when the distance between the free ends of the clamp are adjusted to effect compressive force on the cylindrical object.

The free ends of the clamp are joined together by any suitable means which permits adjusting the compressive force exerted by the clamp. Representative suitable means include, bolts, hooks, latches or the like. One suitable means includes two rods, one each extending through holes in a free end of a clamp section. The rods have through-holes through which threaded bolts extend. Threaded nuts positioned on the threaded ends of the bolts can be rotated to exert force on the free end thereby to adjust the distance between the free ends.

The hinge sections, when employed, are joined together by a rod extending through holes in the hinge section of each piece. The rod is adhered to the interior hole surface of the hinge section of one section while the second section is free to rotate about the rod.

Representative suitable woven fibers which can be utilized in the molded piece include graphite fibers, glass fibers, polyaramid fibers, e.g. Kevlar or the like.

Suitable polymer matrices for forming the molded clamp include epoxy polymers, polyesters, polyvinylesters or the like.

Figure 1:
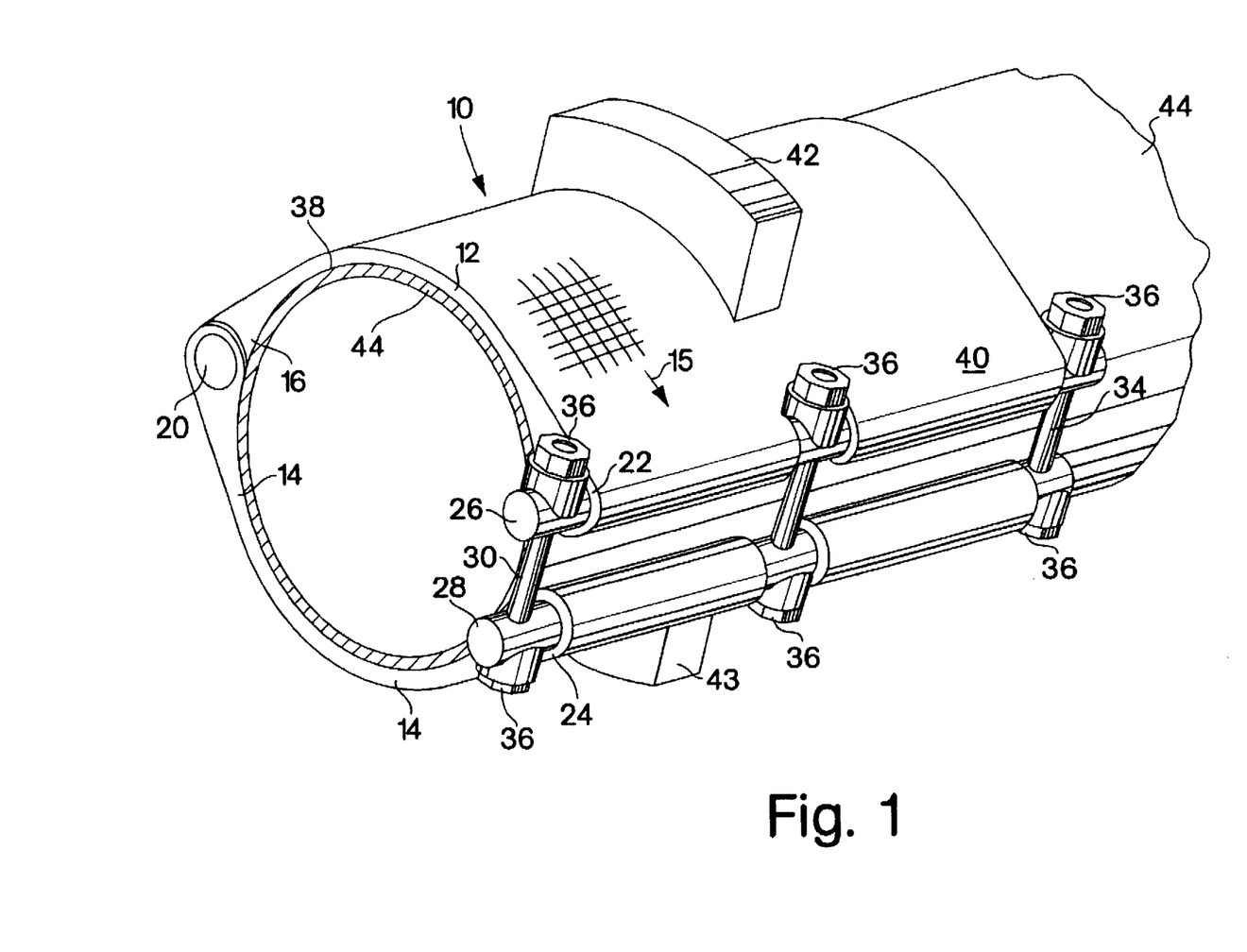
FIG. 1 is an isometric view of a clamp of this invention.

Referring to FIG. 1, the clamp 10 is formed from two molded sections 12 and 14. The sections 12 and 14 are formed from woven fabric having fibers which extend in the direction 15 about the perimeter of the clamp 10. The hinge section 16 of section 12 and hinge section 18 of section 14, each have holes in them to accommodate rod 20 extending the length of clamp 10. The free end 22 of section 12 and free end 24 of section 14 also have holes to accommodate rods 26 and 28 respectively. Holes are positioned through rods 22 and 24 to accommodate bolts 30, 32 and 35 having nuts 36 at each end. The nuts 36 are rotated on the bolts 30, 32 and 34 to adjust the distance between the free end 22 and 24. The interior surface 38 contacts an exterior surface of a cylindrical object 44. The exterior surface 40 of clamp 10 includes at least one key 42 or 43 which fits into a slot within an interior surface of a buoyancy element thereby to fix the buoyancy element on the clamp.

Figure 2:
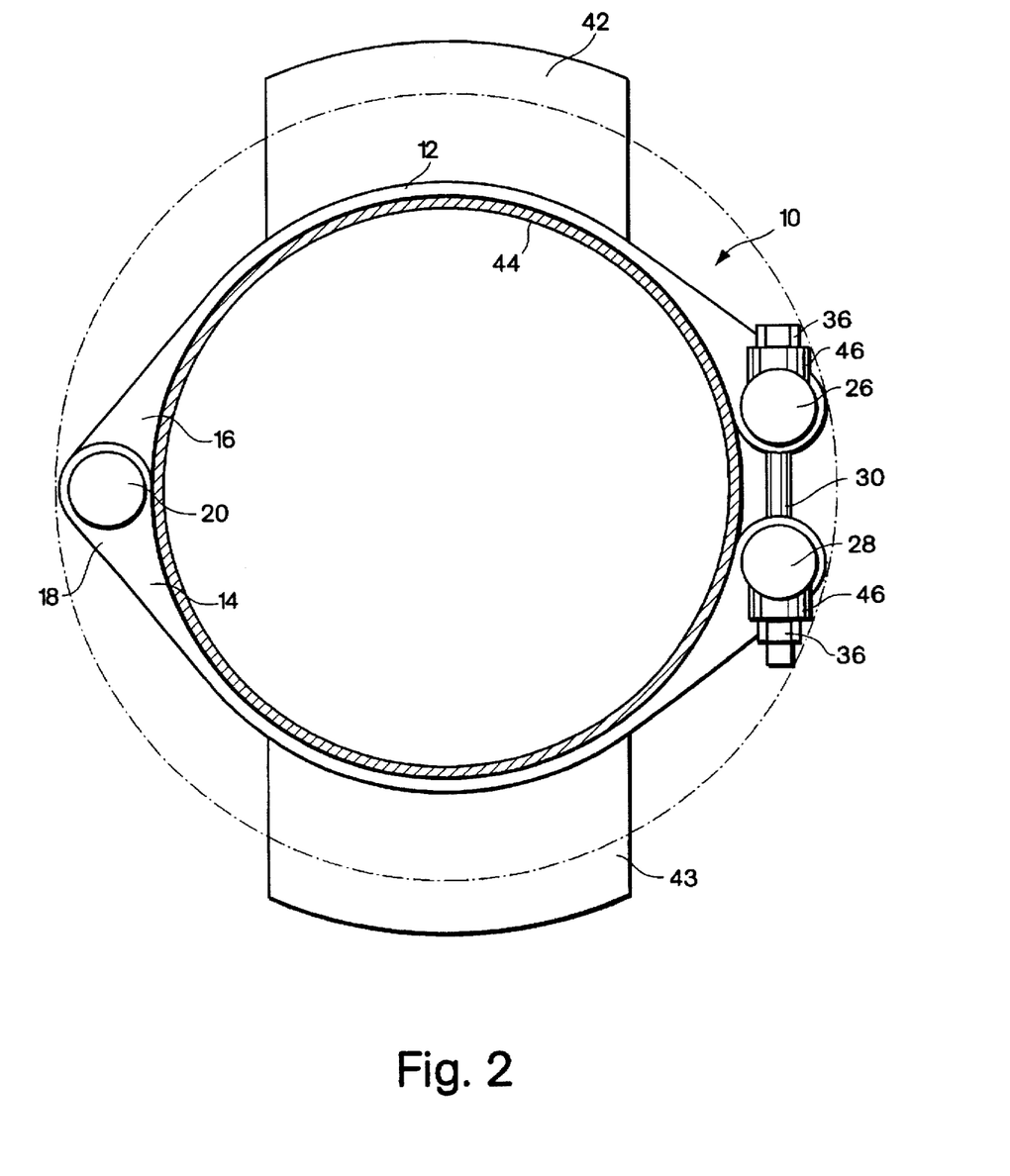
FIG. 2 is a cross-sectional view of the clamp of this invention positioned about a cylindrical object.
Figure 3:
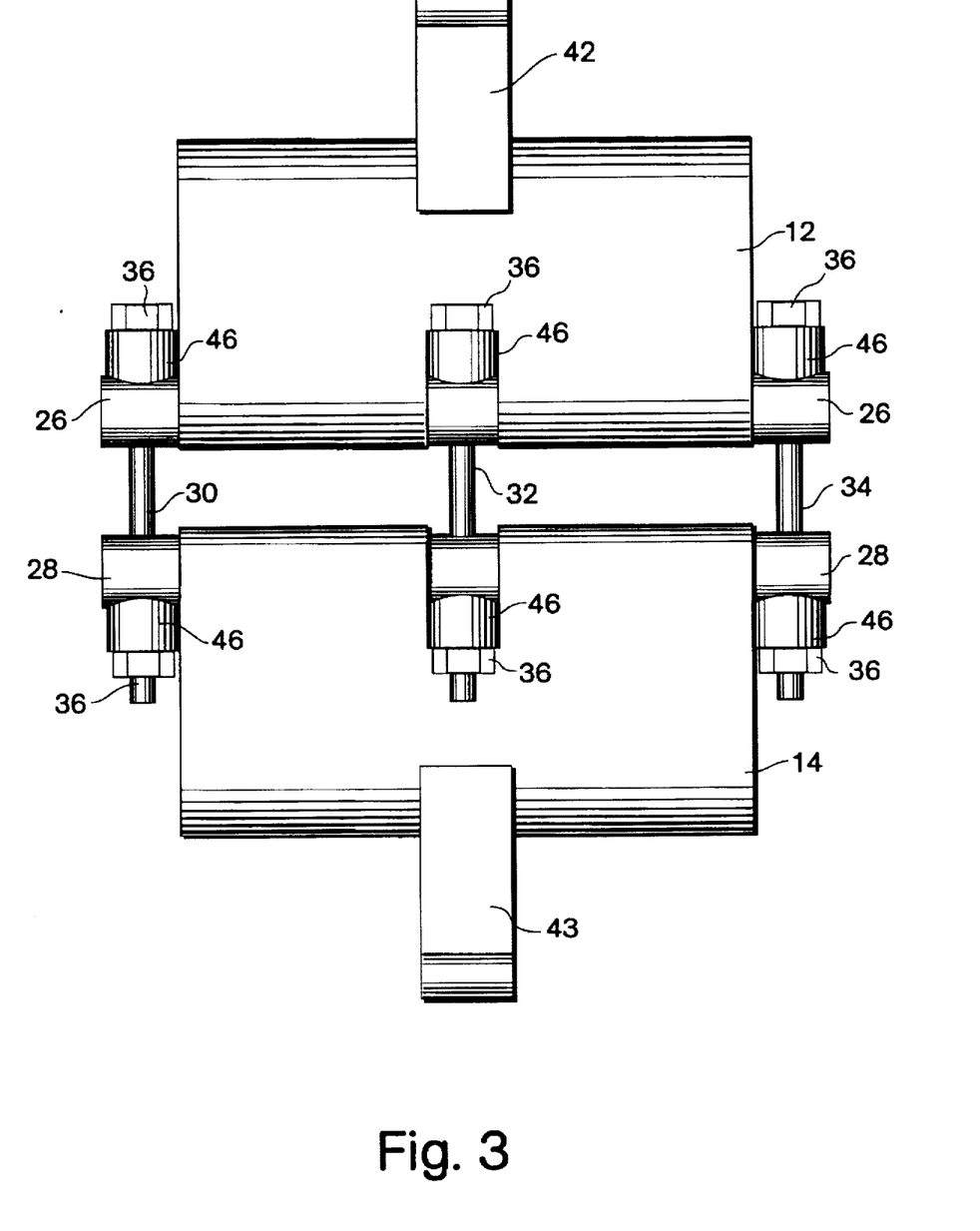
FIG. 3 is a back view of the clamp of FIG. 2.
Figure 4:
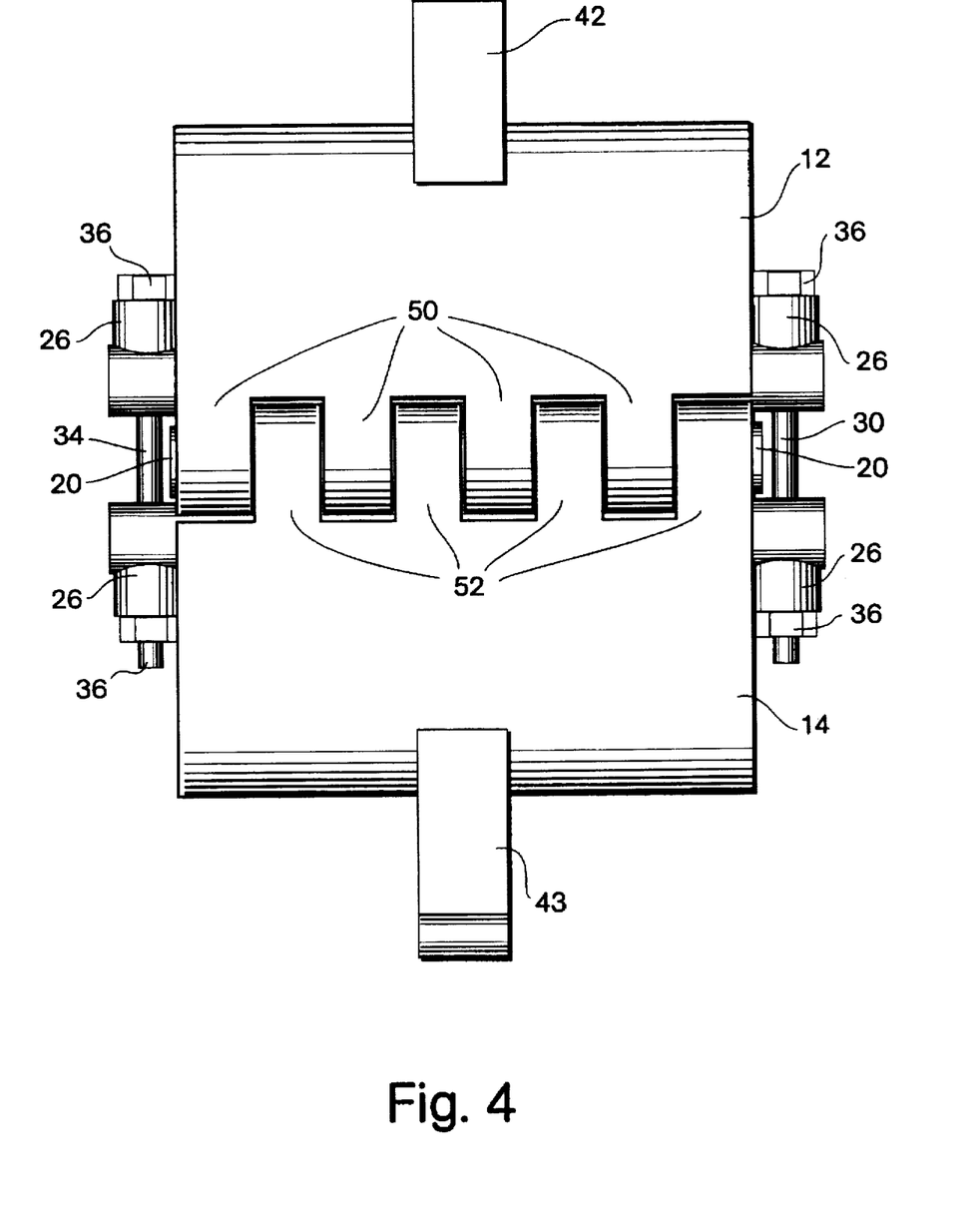
FIG. 4 is a front view of the clamp of FIG. 2.

Referring to FIGS. 2, 3 and 4, a cylindrical object 44 is positioned within clamp 10 and nuts 36 are rotated on bolts 30, 32 and 34. Pads 46 can be positioned between rods 26 and 28 and nuts 36. Each rod 26 and 28, extends through holes in the free end of the clamp. The clamp 10 includes keys 42 and 43 for securing a buoyancy module having slots and positioned about the clamp. The section 12 has a segmented hinge section 50 while section 14 has a segmented hinge section 52 each having holes through which extends rod 20. Rod 20 is adhered to the interior surface of either hinge section 50 or hinge section 52 while the unadhered hinge section is free to rotate about rod 20.

Figure 5:
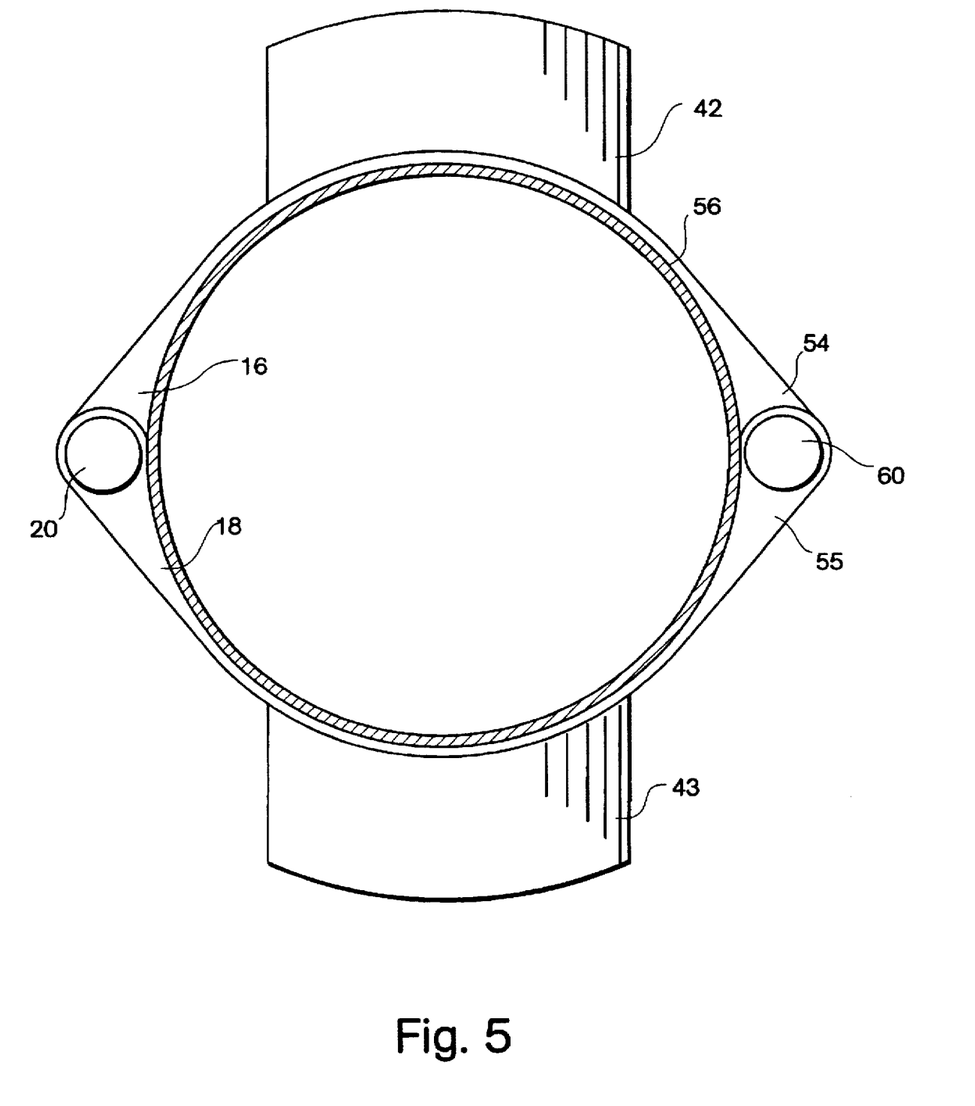
FIG. 5 is a cross sectional view of an alterative clamp of this invention.
Figure 6:
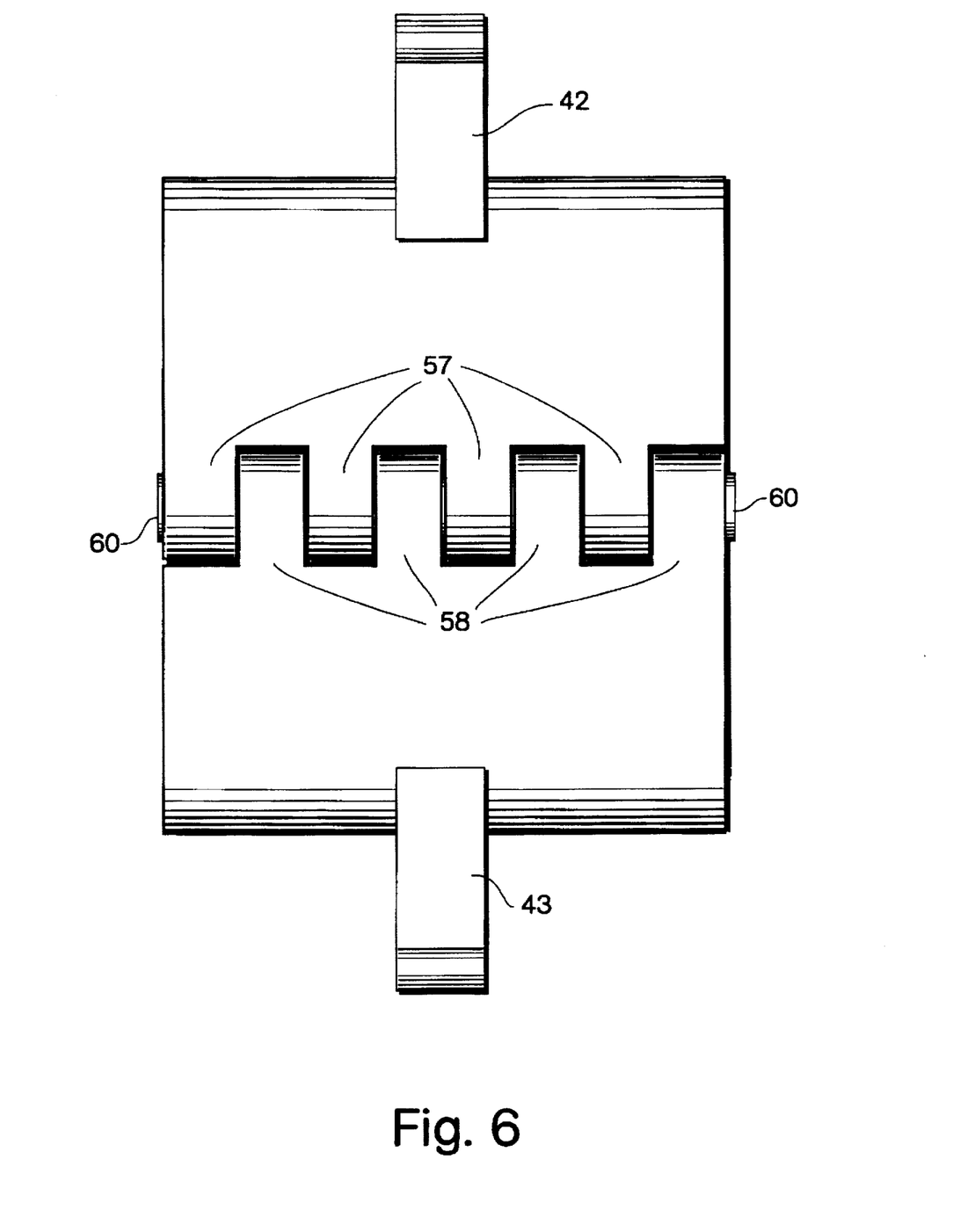
FIG. 6 is a front view of the clamp of FIG. 5.

Referring to FIGS. 5 and 6 wherein like elements to elements of FIGS. 2, 3 and 4 refer to the same element, an embodiment of this invention utilizing only one rod at the free ends is shown. The rod 20 is positioned as shown in FIG. 2 and 4. The free ends 54 and 55 of clamp 56 each have a section 57 or 58 having holes through which rod 60 extends. The extent of mutual intrusion of segmented sections 54 and 55 is determined by the diameter of rod 60. Rod 60 is adhered to the interior surfaces of the holes in segmented sections 54 and 55.

Figure 7:
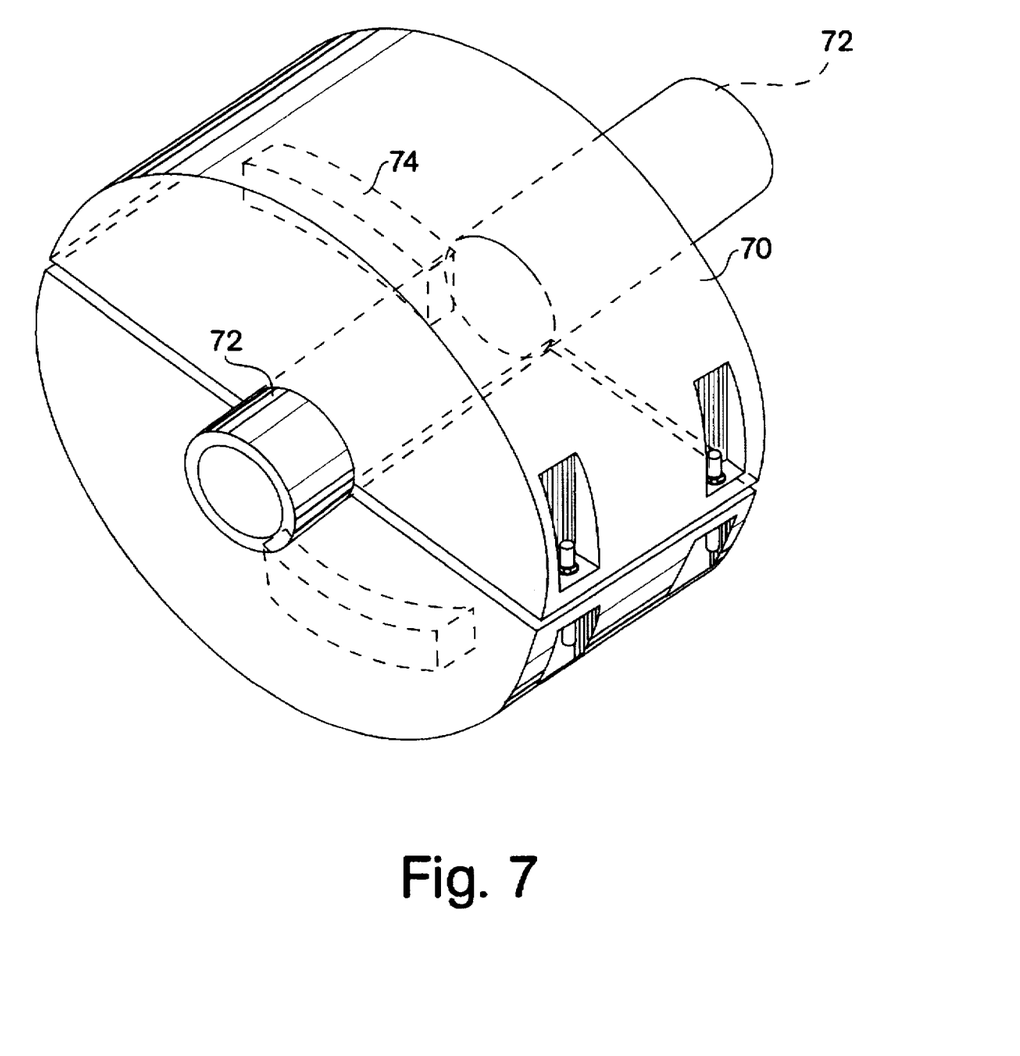
FIG. 7 is an isometric view of a buoyancy module positioned about a clamp of this invention.

Referring to FIG. 7, a buoyancy element 70 is shown which is positioned about a clamp and a cylindrical object 72 as described above. The buoyancy element 70 includes at least one slot 74 to accommodate a key 42 or 43 of clamp 10 described above. If desired the slot can be positioned on the clamp 10 and the key or keys can be positioned on the buoyancy element 70. The buoyancy element can be formed of hollow resin and/or glass beads distributed within a polymeric matrix such as an epoxy matrix.

Figure 8:
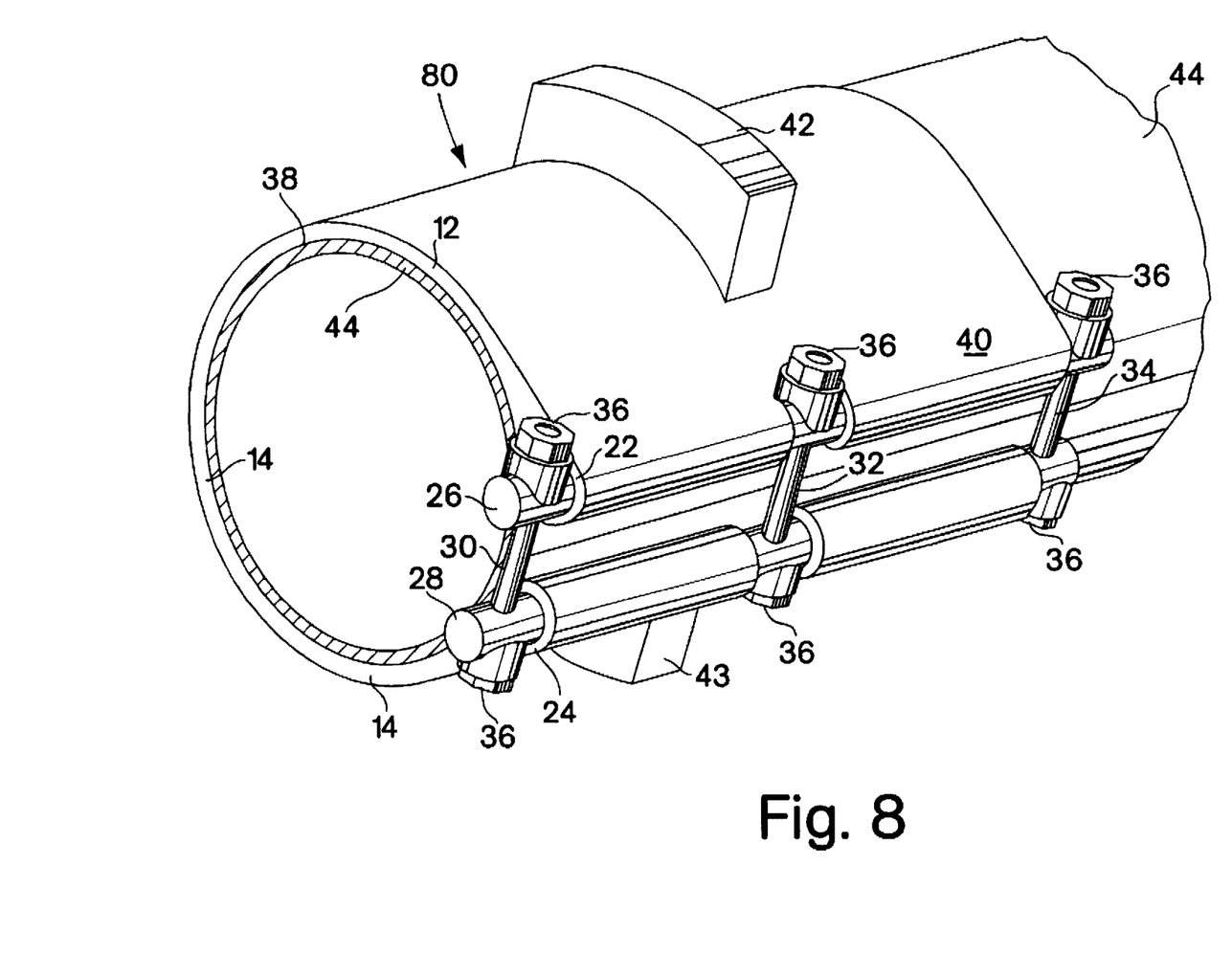
FIG. 8 is an isometric view of a single molded piece clamp of this invention.

Referring to FIG. 8, a hingeless clamp 80 of this invention is shown wherein like element to those of FIG. 1 have the same reference numerals. The free ends 22 and 24 are clamped together in the same manner as described for the embodiment of FIG. 1. The free ends 22 and 24 can be moved toward or away from each other because of the inherent flexibility of the clamp 80 since it is not formed of a metal composition.

Figure 9:
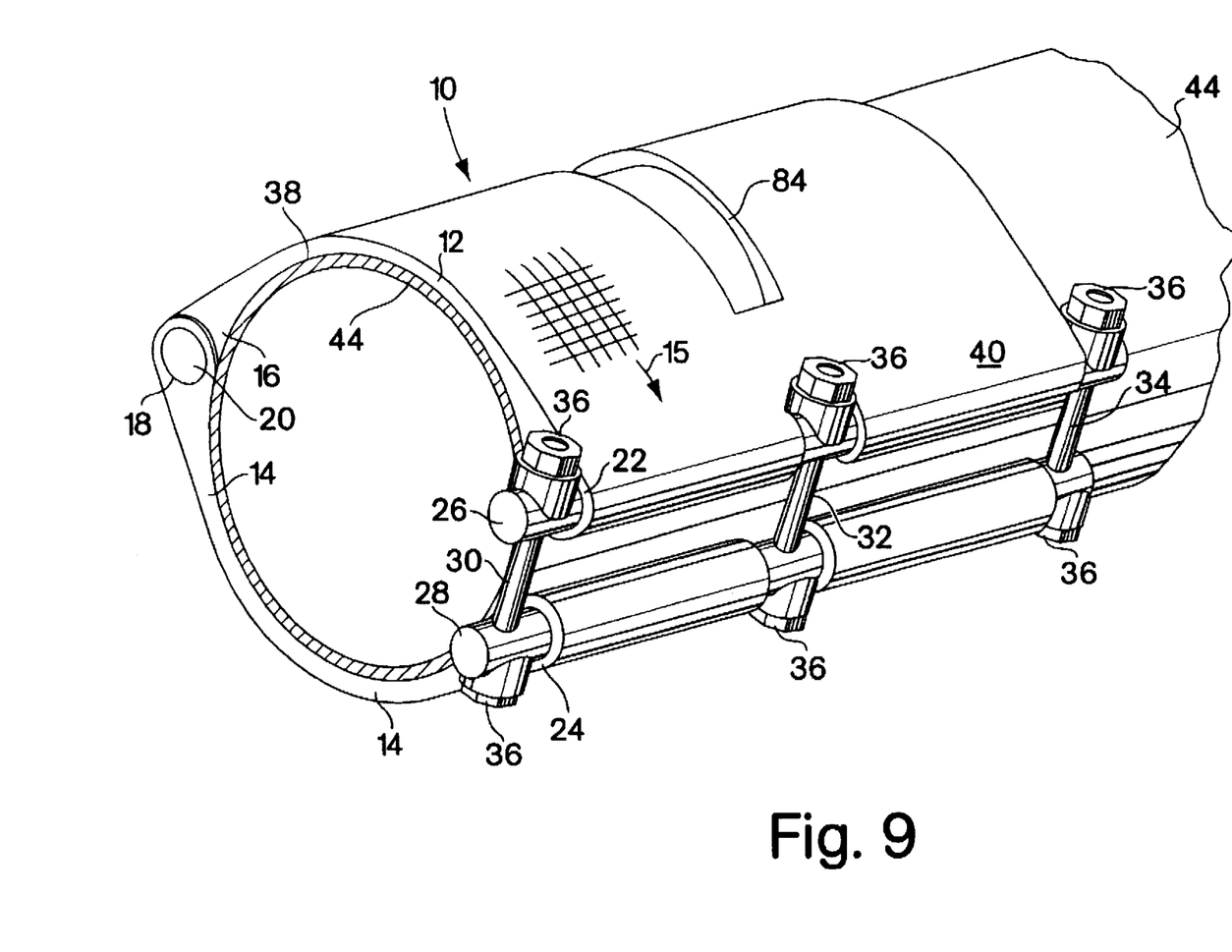
FIG. 9 is an isometric view of an alternative embodiment of the clamp of this invention.

Referring to FIG. 9, like elements to the elements of FIG. 1 are referred to with the same reference numbers. The clamp 82 is identical to the clamp 10 of FIG. 1 except that the exterior surface 40 is provided with a slot 84 rather than a key 42. The slot 84 is configured to fit with a mating key positioned on the buoyancy elements to be positioned about the clamp 82.

While this invention has been described above with reference to a clamp for a buoyancy element, it is to be understood that the clamp of this invention can be utilized with any cylindrical object regardless of the environment for the cylindrical object.

We claim:

1. Apparatus shaped to be positioned about a cylindrical object which comprises:
    a clamp comprising one or two generally cylindrical shaped sections having two free ends and formed from woven polymeric fiber layers in a solid polymeric matrix, said polymeric fiber extending in a direction about a perimeter of said cylindrical object,
    said free ends being joined by means for adjusting the distance between said free ends so as to adjust a compression force exerted by said clamp on said cylindrical object positioned within said clamp,
    said clamp having an outside surface configured to fit with an inside surface of a buoyancy element,
    said buoyancy element positioned about said clamp and having an inside surface configured to fit with said outside surface of said clamp to prevent said buoyancy element from moving along a length of said conduit.

2. The apparatus of claim 1 wherein said clamp is formed from two sections, said sections being joined together by a hinge means separate from said free ends.

3. The apparatus of claim 2 wherein said means for adjusting the distance between said free ends of said clamp comprises two rods wherein each of said rods extends through holes in one of said free ends, each of said rods having at least one through hole, and means extending through said at least one through hole for adjusting the distance between said free ends.

4. The apparatus of claim 2 wherein said hinge means of said clamp comprises a hinge rod extending through holes in each of said two sections and wherein said hinge rod is secured to inside surfaces of holes in only one of said sections.

5. The apparatus of claim 3 wherein said hinge means of said clamp comprises a hinge rod extending through holes in each of said two sections and wherein said hinge rod is secured to inside surfaces of holes in only one of said sections.

6. The apparatus of claim 1 wherein said clamp is formed of one generally cylindrical shaped section wherein said free ends have holes therein and wherein said means for adjusting the distance between said free ends comprises a diameter of a rod extending through said holes.

7. The apparatus of claim 1 wherein said outside surface is configured to include at least one key element and said inside surface includes at least one slot to fit with said at least one key element.

8. The apparatus of claim 7 including said buoyancy element formed from hollow beads selected from the group consisting of glass beads, resin beads and mixtures thereof distributed within a second polymeric matrix.

9. The apparatus of claim 1 wherein said outside surface is configured to include at least one key element and said inside surface includes at least one key element to fit with said at least one slot.

10. The apparatus of claim 9 including said buoyancy element formed from hollow beads selected from the group consisting of glass beads, resin beads and mixtures thereof distributed within a second polymeric matrix.

11. The apparatus of claim 1 including said buoyancy element formed from hollow beads selected from the group consisting of glass beads, resin beads and mixtures thereof distributed within a second polymeric matrix.

12. The clamp of any one of claims 11 or 2 wherein said polymeric matrix is an epoxy matrix.

13. The clamp of claim 12 wherein said fibers are graphite fibers.

14. The clamp of claim 12 wherein said fibers are glass fibers.

15. The clamp of claim 12 wherein said fibers are polyaramid fibers.

* * * * *